United States Patent

[11] 3,584,567

| [72] | Inventor | Charles D. Roach<br>Newport News, Va. |
|---|---|---|
| [21] | Appl. No. | 875,878 |
| [22] | Filed | Nov. 12, 1969 |
| [45] | Patented | June 15, 1971 |
| [73] | Assignee | The United States of America as represented by the Secretary of the Army |

[54] AUTOMATIC SHUTTER
6 Claims, 4 Drawing Figs.

| [52] | U.S. Cl. | 98/119 |
|---|---|---|
| [51] | Int. Cl. | F23l 13/00 |
| [50] | Field of Search | 98/886, 110, 119, 121; 244/129; 49/74; 160/Dig 16 |

[56] References Cited
UNITED STATES PATENTS

| 2,067,144 | 1/1937 | Madden | 98/119X |
| 2,153,359 | 4/1939 | Anderson et al. | 98/110 |
| 2,624,265 | 1/1953 | Mader | 98/119 |
| 2,894,445 | 6/1959 | Schutze | 98/119X |
| 2,965,014 | 12/1960 | Lowery | 98/119 |
| 3,153,819 | 10/1964 | Bond | 160/Dig. 16 |

*Primary Examiner*—Frederick L. Matteson
*Assistant Examiner*—W. C. Anderson
*Attorneys*—Harry M. Saragovitz, Edward J. Kelly and Herbert Berl ABSTRACT: An automatic shutter for use in a window in a pressurized cabin of an aircraft for preventing rapid decompression of the cabin in event of rupture of one or more of its windows. The shutter is of the louvered type, the louvers being hinged at their trailing edges which are lower than their leading edges, and connected at their forward edge by a link. Upon window breakage the inside air pressure builds up a lift under the louvers' lower side to rotate them to a closed position and then keep them in the closed position as long as air pressure exists in the cabin.

PATENTED JUN15 1971 3,584,567

INVENTOR,
Charles D. Roach

BY: Harry M. Saragovitz,
Edward J. Kelly &
Herbert Berl          ATTORNEYS

AUTOMATIC SHUTTER

The invention described herein may be manufactured, used, and licensed by or for the Government for governmental purposes without the payment to me of any royalty thereon.

Aircraft flying at high altitudes must necessarily pressurize the cabin to compensate for the lower air pressure at those altitudes. In event of window breakage or blowout, serious consequences result such as rapid decompressurization of the cabin and danger to the occupants such as hemorrhaging, heart failure or even death.

Most systems compensating for rapid decompression in aircraft cabins are usually complex, heavy, bulky and expensive. Further, some require manual operation by the pilot to initiate their action.

The present invention relates to a simplified shutter mechanism that is easily installed in the window openings of an aircraft cabin which requires no attention and automatically operates upon breakage of a window pane. The shutter consists of a series of vertically spaced louvers of airfoil design which are hinged at their trailing edges and linked at their forward edges. Upon rupture of a window pane inside air pressure of the cabin develops a lift on the louvers and rotates them to a closed position and this pressurized air in the cabin will then act to hold them in the closed position and thereby prevent a sudden and substantial loss of air pressure in the cabin.

It is therefore a primary object of this invention to provide a means to prevent rapid decompression of an aircraft cabin due to a ruptured window pane.

Another object is to provide a device for preventing rapid decompression of an aircraft cabin that is simple of construction and easily installed in a window opening of the aircraft cabin.

Still another object is to provide a louvered shutter mechanism that will automatically close upon rupture of a window pane and be held closed by the cabin air pressure to materially reduce the loss thereof.

Referring to the drawing in which.

Figure 1:
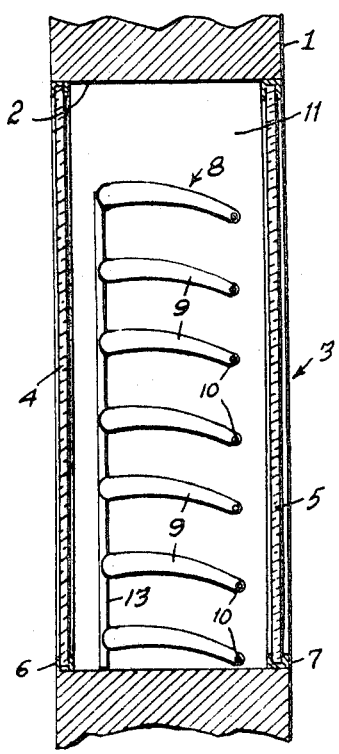
FIG. 1 is a cross-sectional view through a window in the cabin of an aircraft and showing the shutter of the invention in open position, the edges of the louvers being in elevation.
Figure 2:
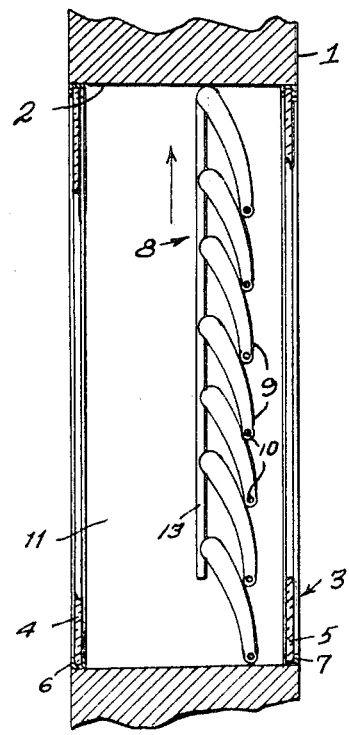
FIG. 2 is a similar view showing the window broken and the shutter closed.

Referring in detail to the drawing in which like reference numerals designate like parts throughout the several views, reference numeral 1 indicates a portion of a wall of the cabin of an aircraft. A window opening is designated by 2. As shown in FIGS. 1 and 2 a window is indicated generally by 3 and as shown, and is a window of the double pane-type having an inside pane 4 and a spaced, outside pane 5. The panes 4 and 5 are usually mounted in mounting channels 6 and 7.

Figure 3:
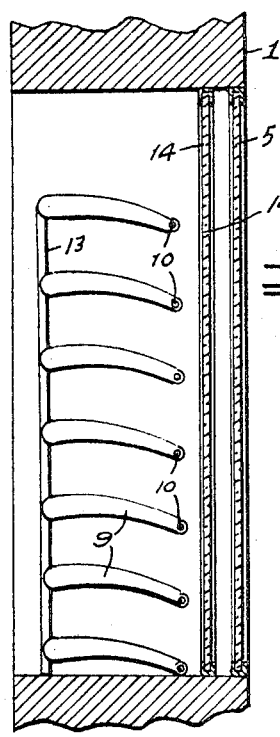
FIG. 3 is a similar view but showing a different arrangement of the window panes, and, FIG. 4 is a perspective view of one of the louvers and showing the means for mounting the louvers in a window opening of the aircraft cabin.
Figure 4:
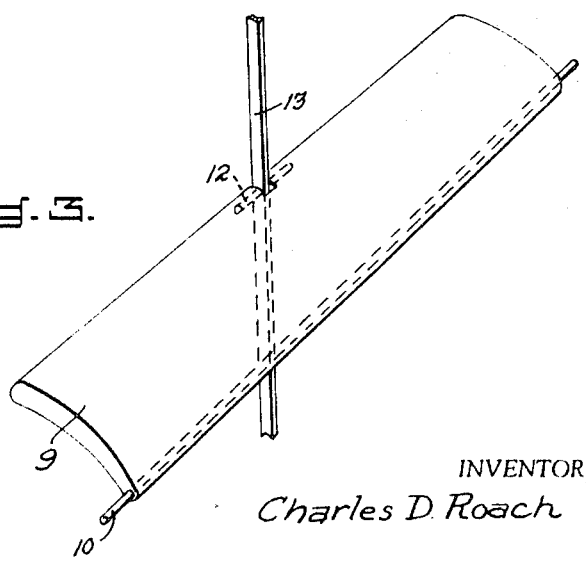

The shutter mechanism of the invention is designated generally by 8 and consists of a series of louvers 9 which are arranged in vertically spaced relationship, as shown. These louvers are substantially airfoil in shape, having a positive camber. Each louver 9 is rotatably mounted at its trailing edge to a shaft 10, which may be anchored in the sidewalls of opening 2. The forward edge of each louver 9 is pivotally connected as at 12 to a mullion link 13 so that all louvers 9 will rotate in unison. The trailing edges of the louvers 9 are positioned somewhat lower than their leading edges as shown. This structure provides an aerodynamic arrangement to pivot the louvers upwardly as the airstream moves from leading edge to trailing edge. Another arrangement of assembly is shown in FIG. 3 wherein an inside pane 14 is installed in a position between the shutter mechanism 8 and the outside pane 5 to prevent interference with the shutter structure.

While a double paned window has been shown, the device will work equally as well in a single paned window provided the pane is on the outer side of the louver mechanism. However, since the cabin of passenger carrying aircraft is usually air conditioned, double paned windows are generally used for thermal purposes.

The shutter is fully automatic in its operation. As illustrated in FIG. 2, the window panes 4 and 5 are shown to be ruptured. When the panes 4 and 5 become ruptured, air pressure in the cabin develops a lift on the lower sides of the louvers 9 and since they are pivotally connected to link 13, all louvers will be lifted together and the cabin air pressure will completely close them and keep them closed. While shutters 9 will not completely prevent loss of air pressure, there would be enough restriction formed to keep the cabin pressurized until the aircraft could descend to a lower level.

What I claim is:

1. An automatic shutter for rapid decompression in a pressurized aircraft cabin having at least one potentially rupturable pane closing said opening, said shutter comprising a plurality of vertically spaced louvers in said opening and disposed on the pressurized side of said pane, means rotatably mounting the trailing edges of said louvers for free rotation to the walls of said opening and means pivotally connecting the forward edges of said louvers together and above their trailing edge whereby when said pane is ruptured outside air will develop a lift on the lower sides of said louvers to rotate then in unison towards a closed position and whereby the air pressure in said cabin will act to maintain them in said closed position.

2. An automatic shutter as set forth in claim 1 wherein each said louver is of airfoil contour in cross section.

3. An automatic shutter as set forth in claim 1 wherein said means for rotatably mounting said louvers comprises a shaft extending longitudinally through the trailing end of each said louver, each said shaft being mounted at its opposite ends to the sidewalls of said opening.

4. An automatic shutter as set forth in claim 1 wherein said means for connecting the forward edges of said louvers comprises at least one vertically disposed bar pivotally connected to the forward edge of each said louver whereby said louvers will rotate in unison.

5. In combination with a pressurized chamber having a potentially rupturable wall portion, a shutter for automatically preventing rapid decompression of the chamber as a result of a sudden break in the potentially rupturable wall portion, said shutter having an airfoil configuration and being pivotally mounted on the high-pressure side of the chamber wall, adjacent to the rupturable portion thereof; means associated with said airfoil to position it in a posture that is substantially normal to the rupturable wall portion and the path of gas flow when rapid decompression occurs, with the forward portion thereof projecting inwardly of the compartment and the rearward edge effecting the pivot mounting whereby upon the rapid outflow of gas across the shutter an aerodynamic lift will be effected upon it, causing a pivoting of the shutter about its rearward edge to block the path of gas egress.

6. The combination of claim 5 in which the shutter has its pivotally mounted rearward edge in a plane that is below the plane of the forward edge.